US006430507B1

(12) United States Patent
Jorgensen et al.

(10) Patent No.: US 6,430,507 B1
(45) Date of Patent: Aug. 6, 2002

(54) METHOD FOR INTEGRATING GRAVITY AND MAGNETIC INVERSION WITH GEOPRESSURE PREDICTION FOR OIL, GAS AND MINERAL EXPLORATION AND PRODUCTION

(75) Inventors: Gregory Joseph Jorgensen; Jerry Lee Kisabeth; Alan Royce Huffman, all of Ponca City, OK (US)

(73) Assignee: Conoco Inc., Houston, TX (US)

( * ) Notice: Subject to any disclaimer, the term of this patent is extended or adjusted under 35 U.S.C. 154(b) by 0 days.

(21) Appl. No.: 09/405,850

(22) Filed: Sep. 24, 1999

Related U.S. Application Data

(63) Continuation-in-part of application No. 09/285,570, filed on Apr. 2, 1999.

(51) Int. Cl.[7] .............................................. G01V 1/40
(52) U.S. Cl. ............................................ 702/6; 703/10
(58) Field of Search ............................... 702/14, 6, 11, 702/16; 703/10, 606; 367/38

(56) References Cited

U.S. PATENT DOCUMENTS

| | | | |
|---|---|---|---|
| 5,675,147 A | 10/1997 | Ekstrom et al. | 250/256 |
| 5,678,643 A | 10/1997 | Robbins et al. | 175/45 |
| 5,729,451 A | 3/1998 | Gibbs et al. | 364/421 |
| 5,889,729 A | 3/1999 | Frenkel et al. | 367/73 |
| 5,933,345 A * | 8/1999 | Martin et al. | 702/11 |
| 6,278,948 B1 * | 8/2001 | Jorgensen et al. | 702/6 |

OTHER PUBLICATIONS

Yishi, L. et al., "Simultaneous Inversion of Gravimetric and Magnetic Data Constrained With Internal Correspondence Analysis and its Application to the Tarim Basin," Seismology and Geology, vol. 18, No. 4, pp 361–68 (Dec. 1996)—Abstract only presented in English.

Xichen, W., "The Research on Generalizeal Joint Inversion Method Used to Inverse Magnetic and Density Interface," Jnl of Changchun University of Earth Science (1990)—Abstract only presented in English.

Rongchang, J., "Normalized Solution of Linear Equation System With Applications," Geophysical Prospecting For Petroleum, vol. 31, No. 2, pp. 38–46 (Jun. 1992)—Abstract only presented in English.

Wen–Cai, Y. et al., "Velocity Imaging From Reflection Seismic Data by Joint Inversion Techniques," Acta Geophysica Sinica, vol. 30, No. 6, pp. 617–627 (Nov. 1987)—Abstract only presented in English.

Zhaoqin, M., "Optimal filtering method for separating off gravity anomalies," OGP, 1997 32(3), pp. 376–386—Abstract only presented in English.

Xiwen, W., "Direct hydrocarbon prediction using joint inversion of gravimetric and seismic data," OGP, 1997, 32(2), pp. 221–228—Abstract only presented in English.

Rui, F. et al., "A Non–Block Consistent Model in Seismo–Gravity Inversion," Acta Geophysica Sinica, vol. 36, No. 4, pp. 463–475 (Jul. 1993)—Abstract only presented in English.

(List continued on next page.)

*Primary Examiner*—Edward Lefkowitz
*Assistant Examiner*—Victor J. Taylor
(74) *Attorney, Agent, or Firm*—Madan Mossman & Sriram

(57) ABSTRACT

A method for determining formation pore pressure uses seismic data to derive an initial density model. Potential fields data are then used to derive the lower boundary of anomalous density zones (e.g., salt, shale diapirs, igneous or magmatic formations) by an inversion process. The model data are integrated vertically in two or three dimensions to determine an overburden stress for the subsurface that includes a proper treatment of the anomalous density zone. The velocity measurements determined from the seismic data are used to determine the effective stress based on appropriate relationships between effective stress and velocity. The fluid pressure is then obtained as the difference between the overburden stress and the effective stress.

32 Claims, 2 Drawing Sheets

OTHER PUBLICATIONS

Xiaoping, M. et al., "Gravity inversion using weight–smoothed boundary element method," OGP, 1995, 30(4), pp. 523–532—Abstract only presented in English.

Bell, R., Full Tensor Gradiometry: 3–D Tool for the Next Century, pp. 190–193 and drawings (date and publication unknown).

Pratson, L.R. et al., "A High Resolution 3–D Marine Gravity Gradiometry Survey over a Gulf of Mexico Deepwater Subsalt Prospect in the Mississippi Canyon Area," (Apr. 1994)—Abstract.

Egorova, T.P., "Preliminary 3–D Density Model for the Lithosphere of Dnieper–Donets Basin on the Basis of Gravity and Seismic Data," pp. 191–193 (date and publication unknown).

Dransfield, M.H., "Invariments of the Gravity Gradient Tensor for Exploration Geophysics," CRA Exploration, Abstract G–12B–3.

Kaufmann, R. et al., "Joint Tomographic Inversion of Travel–Time Residuals and Gravity Anomalies for Crustal Velocity Structure in Southeast Tennessee," School of Earth and Atmospheric Sciences, Abstract S41A–4.

Mickus, K. et al., "Gravity Gradient Tensor Analysis of the Arkoma Basin and Ouachita Mountains, Ark. And Ok.," Abstract T11B–13.

Bocchio, F., "A <Tidal> Magnetic Field?," Annali Di Geofisica., vol. XL, No. 5, pp. 1029–1032 (Oct. 1997).

Zadro, Maria et al., "Spectral methods in gravity inversion: the geopotential field and its derivatives," pp. 1433–1443 (date and publication unknown).

Bocchio, F., "Research Note: on some implications of the Poisson relation," Geophys. J. Int. (1998) 133, 207–08.

Pallium, R. Jay et al., "Seismic theory, inversion and resolution," Seismological Research Letters, vol. 62, No. 1, (Jan.–Mar., 1991), p. 19.

Geophysics, Session 112, Oct. 30, 1996 (CCC:C109) Abstract pp. A–283–284.

Murthy, I.V.R. et al., "Gravity Anomalies of a Vertical Cylinder of Polygonal Cross–Section and Their Inversion," Computers & Geosciences, vol. 22, No. 6 pp. 625–630 (1996).

Zheng, Y. et al., "Joint inversion of gravity and magnetic anomalies of eastern Canada," Can. J. Earth Sci., 35: 832–53 (1998).

Chamot–Rooke N., et al., "Constraints on Moho Depth and Crustal Thickness in the Liguro–Provencal Basin from a 3D Gravity Inversion: Geodynamic Implications," Revue de L'Institut Francais Du Petrole, vol. 52, No. 6 Nov.–Dec. 1997 pp. 557–583.

Association Round Table pp. 1925–1926 (date unknown).

Bowin, C. et al., "Depth estimates from ratios of gravity, geoid, and gravity gradient anomalies," Geophysics, vol. 51, No. 1 (Jan. 1986), pp. 123–136, 12 Figs, 2 Tables.

Hansen, R., "Euler Deconvolution and Its Generalizations," pp. 1–8 (date unknown).

Jacobsen, B., "A case for upward continuation as a standard separation filter for potential–field maps," Geophysics, vol. 52, No. 8 (Aug. 1987), pp. 1138–1148, 10 Figs.

Vasco, D.W., "Groups, algebras, and the non–linearity of geophysical inverse problems," Geophys. J. Int. (1997), 131, pp. 9–23.

Ates, A., et al., "Geophysical investigations of the deep structure of the Aydin–Milas region, southwest Turkey: Evidence for the possible extension of the Hellenic Arc," Isr. J. Earth Sci.: 46: pp. 29–40 (1997).

Doering, J. et al., "Gravity Modeling in the Southern Urals," Abstract, Geophysics/Tectonophysics (Posters) Session 159 (Oct. 1996).

Opfer, R.R., "Synthetic Gravity Modelling—An Interpretation Tool to Integrate Seismic and Gravity Data," P140 EAEG—55$^{th}$ Mtg and Technical Exhibition (Jun. 1993).

Papp, G., "Trend Models in the Least–Squares Prediction of Free–Air Gravity Anomalies," Periodica Polytechnica Ser. Civil. Eng., vol. 37, No. 2, pp. 109–130 (1993).

Sumanovac, F., et al., "System Architecture for 3D Gravity Modelling," Geol. Croat. 49/2 pp. 145–153, 12 Figs. (1996).

Danchiv, D. et al., "Computation of Gravity Gradient Tensor in a Rectangular System of Prisms for Vrancea Zone, Galati–Focsani Alignment," Int'l Geophysical Symposium, p. 99 (date unknown).

Henke, C.H. et al., "Interactive three–dimensional gravity inversion and forward modeling using a visualization system," Hamburg, University, Germany, pp. 430–431 (date unknown).

Anderson, R.N., 1998 Annual Meeting Abstract No. 27, "Future Technologies—A Far–Field Industry Review," AAPG Annual Meeting (May, 1998).

Abdelrahman, E.M. et al., "Depth determination for buried spherical and horizontal cylindrical bodies: an iterative approach using moving average residual gravity anomalies," J. Univ Kuwait (Sci.) 22 pp. 114–121 (1995).

Fairhead, J.D. et al., "Application of Semi–Automated Interpretation Methods in Western Siberia and Southern Sudan," EAEG 56$^{th}$ Meeting and Technical Exhibition, 1037 (Jun. 1994).

Casas, A. et al., "An Interactive 2D and 3D Gravity Modelling Programme for IBM–Compatible Personal Computers," EAGE 58$^{th}$ Conference and Technical Exhibition, P184 (Jun. 1996).

Olesen, Odleiv, "Application of the Potential Field Methods to the Study of the Lofoten–Lopphavet Area, Northern Norway," EAEG 56$^{th}$ Meeting and Technical Exhibition, 1034 (Jun. 1994).

Henke, C.H. et al., "Geomaster—A Programme for Interactive 3D Gravity Inversion and Forward Modelling," EAGE 57$^{th}$ Conference and Technical Exhibition, P145 (Jun. 1995).

Stiopol, D. et al., "Gravity and Magnetics Studies in the Vrancea Zone of Romania," EAGE 58$^{th}$ Conference and Technical Exhibition, M056 (Jun. 1996).

Radhakrishna, M. et al., "Gravity Inversion of Closed Two–Dimensional Bodies," Bollettino Di Geofisica Teorica Ed Applicata, vol. XXXIV, No. 136, pp. 287–296 (Dec. 1992).

Nandi, B.K., et al., "A short note on: Identification of the shape of simple causative sources from gravity data," Geophysical Prospecting, 45, pp. 513–520 (1997).

Silitonga, T.H. et al., "Relation of Reservoir Condition Changes to Precision Gravity Measurement with Contribution 3–D Model in Kamojang Geothermal Field," Proceedings Indonesian Petroleum Association (Oct. 1995).

Schenk, R.L. et al., "Integrated Gravity Modeling of Salt Feature in the Mississippi Salt Basin," Transactions of the Gulf Coast Association of Geological Societies, vol. XLVI (1996).

Abstract Page, EOS, vol. 61, No. 17 (Apr. 1980), p. 300.

Mjelde, R. et al., "Crustal structure of the northern part of the Voring Basin, mid–Norway margin, from wide–angle seismic and gravity data," Tectonophysics 293 (1998) 175–205.

Kilty, K., "Short Note: Werner deconvolution of profile potential field data," Geophysics, vol. 48, No. 2 (Feb. 1983):p. 234–237, 2 Figs, 1 Table.

Coburn, G.W., "Applied Geophysics Report: 3D full tensor gradient method improves subsalt interpretation," Bell Geospace, Inc., (Sep. 1998).

Guspi, F., "Short Note: Three–dimensional Fourier gravity inversion with arbitrary density contrast," Geophysics, vol. 57, No. 1 (Jan. 1992):p. 131–135, 4 Figs.

Garcia–Abdeslem, J., "Short note: Gravitational attraction of a rectangular prism with depth–dependent density," Geophysics, vol. 57, No. 3 (Mar. 1992) p. 470–473, 3 Figs.

Guspi, F., "General 2D gravity inversion with density contrast varying with depth," Geoexploration 26 (1990) 253–265.

Dindi, E.W. et al., "Joint three–dimensional inversion of gravity and magnetic data from Jombo Hill alkaline complex, Kenya," Jnl of Geological Society, vol. 145 (1998) pp. 493–504, 12 Figs. 3 Tables.

Richardson, R.M. et al., "The Inversion of Gravity Data into Three–Dimensional Polyhedral Models," Jnl Geophysical Research, vol. 94, No. B6 pp. 7555–7562 (Jun. 1989).

Prutzman, J., "Cold–War Stealth Science Can Aid Seismic Interpretation," JPT, pp. 56–57 (Jan. 1998).

Lines, L.R. et al., "Tutorial A Review of Least–Squares Inversion and its Application to Geophysical Problems," Geophysical Prospecting 32, 159–186 (1984).

Kwok, Y., "Gravity Gradient Tensors Due to a Polyhedron with Polygonal Facets," Geophysical Prospecting 39, 435–443 (1991).

Kwok, Y., "Singularities in gravity computational for vertical cylinders and prisms," Geophys. J. Int. (1991) 104. 1–10.

Montana, C.J. et al., "Program to Calculate the Gravitational Field and Gravity Gradient Tensor Resulting From a System of Right Rectangular Prisms," Computers & Geosciences, vol. 18, No. 5, pp. 587–602 (1992).

Soler, T., "A matrix representation of the potential second–rank gradient tensor for local modelling," Geophys. J.R. astr. Soc. (1985) 81, 363–379.

Hynes, A., "Gravity, flexure,and the deep structure of the Grenville Front, easter Quebec and Labrador," Can. J. Earth Sci., vol. 31 1001–1011 (1994).

Zeyen, H. et al., "3–D joint inversion of magnetic and gravimetric data with a priori information," Geophys. J. Int. (1993) 112, 224–256.

Marino, J. et al., "Gravity and magnetic models of the Midcontinent Rift in eastern Lake Superior," Can J. Earth Sci. vol. 31 (1994) 661–674.

Thomas, M.D. et al., "An interpretation of gravity anomalies over the Midcontinent Rift, Lake Superior, constrained by GLIMPCE seismic and aeromagnetic data," Can. J. Earth Sci. vol. 31 (1994) 682–697.

Murthy, I.V.R. et al., "Gravity Inversion of Horizontal Circular Discs and Vertical Circular Cylinders," Computers & Geosciences vol. 20 No. 5, pp. 821–838 (1994).

Rao, C.V. et al., "Forward Modeling: Gravity Anomalies of Two–Dimensional Bodies of Arbitrary Shape with Hyperbolic and Parabolic Density Functions," Computers & Geosciences vol. 20 No. 5 pp. 873–880 (1994).

Chai, Y. et al., "Gravity inversion of an interface above which the density contrast varies exponentially with depth," Geophysics, vol. 53, No. 6 (Jun. 1988) p. 837–845, 7 Figs. 1 Table.

Hammer, P.T.C. et al., "Gravity inversion using seminorm, minimization: Density modeling of Jasper Seamount," Geophysics, vol. 56, No. 1 (Jan. 1991) p. 68–79, 7 Figs.

Holstein, H. et al., "Gravimetric analysis of uniform polyhedra," Geophysics, vol. 61, No. 2 (Mar.–Apr. 1996) p. 357–364, 6 Figs., 5 Tables.

Lee, T. et al., "Inversion modeling of gravity with prismatic mass bodies," Geophysics, vol. 56, No. 9 (Sep. 1991), p. 1365–1376, 7 Figs.

Nekut, A.G., "Borehole gravity gradiometry," Geophysics, vol. 54, No. 2 (Feb. 1989) p. 225–234, 12 Figs.

Pedersen, L.B. et al., "The gradient tensor of potential field anomalies: Some implications on data collection and data processing of maps," Geophysics, vol. 55, No. 12 (Dec. 1990) p. 1558–1566, 6 Figs.

Vasco, D.W. et al., "Inversion of airborne gravity gradient data, southwestern Oklahoma," Geophysics, vol. 56, No. 1 (Jan. 1991) p. 90–101, 9 Figs., 1 Table.

Rummel, R. et al., "Spectral analysis of the full gravity tensor," Geophys. J. Int. (1992) 111, 159–169.

Holliger, K. et al., "A comparison of the Moho interpreted from gravity data and from deep seismic reflection data in the northern North Sea," Geophysical Jnl (1989) 97 pp. 247–258.

Guspi, F., "Short Note: Three–dimensional Fourier gravity inversion with arbitrary density contrast," Geophysics, vol. 57, No. 1 (Jan. 1992) p. 131–135, 4 Figs.

Bulakh, E.G. et al., "Singularity Criteria for Solution of Inverse Gravimetry Problem by the Selection Method," Gaffes. J. 1995, vol. 15, pp. 173–187.

Bulakh, E.G. et al., "Direct and Inverse Gravimetric Problems for a Class of Bodies Approximated by Horizontal Plates," Geophys. J., 1995, vol. 14, pp. 315–330.

Cassano, E. et al., "Gravity and Magnetic Methods in Crustal Exploration," Potential of Deep Seismic Profiling for Hydrocarbon Exploration, Paris 1990, pp. 95–104.

Ceron, F.A. et al., "A Non Linear Iterative Method for the Inversion of Potential Field Data," Rev. Inst. Mex. Petrol., vol. XXIII, No. 3, pp. 22–36 (Jul. 1991)—Abstract only presented in English.

* cited by examiner

METHOD FOR INTEGRATING GRAVITY AND MAGNETIC INVERSION WITH GEOPRESSURE PREDICTION FOR OIL, GAS AND MINERAL EXPLORATION AND PRODUCTION

CROSS REFERENCES TO RELATED APPLICATIONS

This application is a Continuation-in-Part of U.S. patent application Ser. No. 09/285,570 filed on Apr. 2, 1999.

BACKGROUND OF THE INVENTION

1. Field of the Invention

The present invention pertains to processing gravity and magnetic data using vector and tensor data along with seismic data and more particularly to the inversion of gravity and magnetic data and combining with seismic data to detect abnormally pressured formations in general, and with specific application to areas underneath anomalies such as salt, igneous or magmatic formations.

2. Related Prior Art

Typically, while drilling an oil or gas well, the density of the drilling mud must be controlled so that its hydrostatic pressure is not less than the pore fluid pressure in any formation along the uncased borehole. Otherwise, formation fluid may flow into the wellbore, and cause a "kick." Kicks can lead to blowouts if the flow is not stopped before the formation fluid reaches the top of the well. If the fluid contains hydrocarbons, there is a serious risk of an explosion triggered by a spark. For this reason, wellbores are drilled with a slight excess of the borehole fluid pressure over the formation fluid pressure.

A large excess of the borehole fluid pressure over the formation fluid pressure, on the other hand, is also undesirable. Fractures in the borehole wall may result in loss of circulation of the drilling fluid, resulting in stuck drill strings. Even if drilling can be continued, it is slowed down, resulting in greater costs. Serious formation damage may also occur.

Pressure prediction is done by estimating certain key parameters that include the overburden stress or confining stress, which is defined as the total lithostatic load on a rock volume at a given depth, and the effective stress, which is defined as the net load on the grain framework of the rock at a given depth. These two relations are then used in the Terzaghi effective stress law to estimate the fluid or pore pressure. Terzaghi's law states that:

$$Pc = Pe + Pp$$

where:
 (Pc)=the confining stress
 (Pe)=the stresses born by the grains, and
 (Pp)=the stress born by the fluid.

Some workers treat a special case of Terzaghi's law where the confining stress is assumed to be the mean stress as opposed to the vertical confining stress. It should be acknowledged that this difference exists, but that it does not effect the embodiments of the present invention as they will pertain to estimating the total overburden load, which can then be converted to either vertical confining stress or mean stress based on the stress state assumptions that are made. The current prior art used for estimating confining stress is to use a density log from a nearby calibration well and integrate the density data to obtain the overburden load. This calibration was then applied from the mudline down to depths usually beyond the depth of sampling to predict the overburden away from the calibration well.

It has long been recognized that velocities of seismic waves through sedimentary formations are a function of "effective stress," defined as the difference between the stress caused by the overburden and the pore fluid pressure. A number of methods have been used to measure the seismic velocities through underground formations and make an estimate of the formation fluid pressure from the measured velocities. Plumley (1980) and U.S. Pat. No. 5,200,929 issued to Bowers, (the '929 patent) describe a method for estimating the pore fluid pressure at a specified location. The method also accounts for possible hysterisis effects due to unloading of the rock formation. The method utilized a pair of sonic velocity-effective stress relations. One relationship is for formations in which the current effective stress is the highest ever experienced. A second relationship is used when the effective stress has been reduced from the maximum effective stress experienced by the rock and hysteresis must be accounted for.

The '929 patent uses density data from nearby wells or from a geologically similar well to obtain the overburden stress. In most circumstances, the overburden stress may be adequately described by general compaction models in which the density increases with depth, giving rise to a corresponding relation for the relation between depth and overburden. In the absence of well control, determination of the overburden stress even within a sedimentary column is problematic. Furthermore, there are circumstances in which the model of a density that increases uniformly with depth is not valid. In such cases, the assumption of increasing density with depth is violated and a different approach to estimation of the overburden stress is needed.

There are several types of situations that may arise wherein a model of density increasing with depth and compaction is not valid. In the first case, there is a region of abnormally high density in the subsurface, usually of magmatic origin. The region could consist of an extrusive or intrusive volcanic material having relative density of 2.8 or higher. When such a formation is present within a sedimentary section where the relative density is typically between 2.4 and 2.65, the result is an increase in the overburden stress underneath the formation over what would be determined by prior art calculations. On the other hand, a region of abnormally low density may occur from salt bodies (2.10) or shale diapirs. In such a case, the overburden stress is abnormally low compared to what would be determined by prior art methods. In either case, even if the effective stress could be determined from seismic velocity measurements, a formation fluid pressure determination based on a prior art density model would be invalid.

In prior art, it is common to extrapolate away from a control well to derive an initial pressure model. When abnormally pressured sediments are present having higher porosity and lower density than sediments in the control well, the model of increasing density with depth is violated and the confining pressure is overestimated.

Exploration for hydrocarbons in subsurface environments containing highly anomalous density variations have always presented problems for traditional seismic imaging techniques by concealing geologic structures beneath zones of anomalous density.

There have also been methods for identifying subsurface formations beneath highly anomalous zones using only seismic data to create a model and processing the data to identify formations in light of the model. By further processing acoustic seismic data, the original model is modified or adjusted to more closely approximate reality.

An example of further processing seismic data to improve a model is U.S. Pat. No. 4,964,103, titled "Three Dimensional Before Stack Depth Migration of Two Dimensional or Three Dimensional Data", issued to Johnson. This patent provides a method of creating a three dimensional model from two dimensional seismic data. This is done by providing a method of ray tracing to move before stack trace segments to their approximate three dimensional position. The trace segments are scaled to depth, binned, stacked and compared to the seismic model. The model can then be changed to match the depth trace segments which will be stacked better, moved closer to their correct three dimensional position and will compare better to the model. This patent uses a rather extensive seismic process to modify a seismic model that is not accurate.

There is a need for a method for accurate determination of fluid pressures in the subsurface that (1) does not require the availability of density logs and (2) can more accurately determine the density of the subsurface in 2D or 3D away from and deeper than the limits of density from well control. Such a method should preferably be able to obtain fluid pressure even in the presence of anomalous formations that have densities significantly different from those expected in normal sedimentary columns or that predicted by density values in single or multiple wells. The present invention satisfies this need.

SUMMARY OF THE INVENTION

The present invention incorporates a robust inversion process to determine subsurface fluid pressures using seismic data in combination with vector and tensor potential fields data, both gravity and magnetics. Velocity estimates from seismic data are used to provide an initial estimate for the density of subsurface formations using relations such as the well known Gardner relation calibrated to local well data. This is used in an inversion scheme to invert the potential fields data and obtain a density model for the subsurface. In the inversion process, constraints may be placed on the density model based on the seismically determined velocities. The seismically determined velocities give an estimate of the effective stress while the inverted density model gives the overburden stress. The difference between the overburden and the effective stress is the fluid pressure. In an alternate embodiment of the invention, the method is used to obtain density models of anomalous zones such as salt bodies, shale diapirs, and extrusive or intrusive igneous bodies, where seismic data is unable to obtain accurate velocity estimates or do accurate imaging due to ray path distortions. The geometries and densities of these anomalous bodies are then used to generate improved overburden estimates compared to the prior art where only nearby well densities were used to constrain the overburden. For example, in the case of salt formations in the Gulf of Mexico, a top of a salt map derived from seismic imaging along with a density model and bathymetry, are utilized to produce a base of salt model from the inversion process. This may be used as input to the seismic data to obtain velocity (and effective stress) information underneath the anomalous zone.

DESCRIPTION OF THE PREFERRED EMBODIMENT

Figure 1:
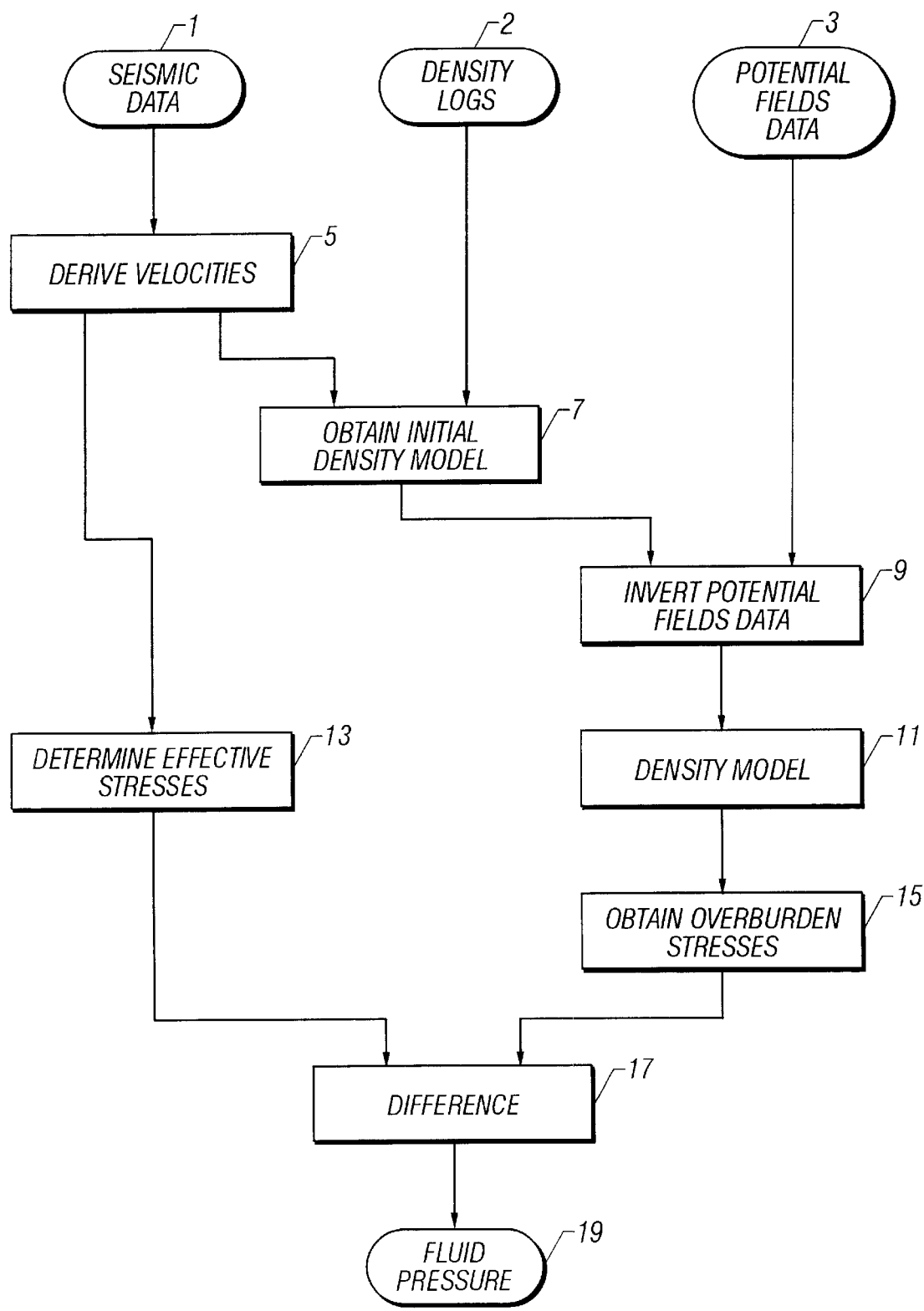
FIG. 1 illustrates an embodiment of the invention for using seismic and potential fields data for determination of formation fluid pressure in sedimentary rocks.
Figure 2:
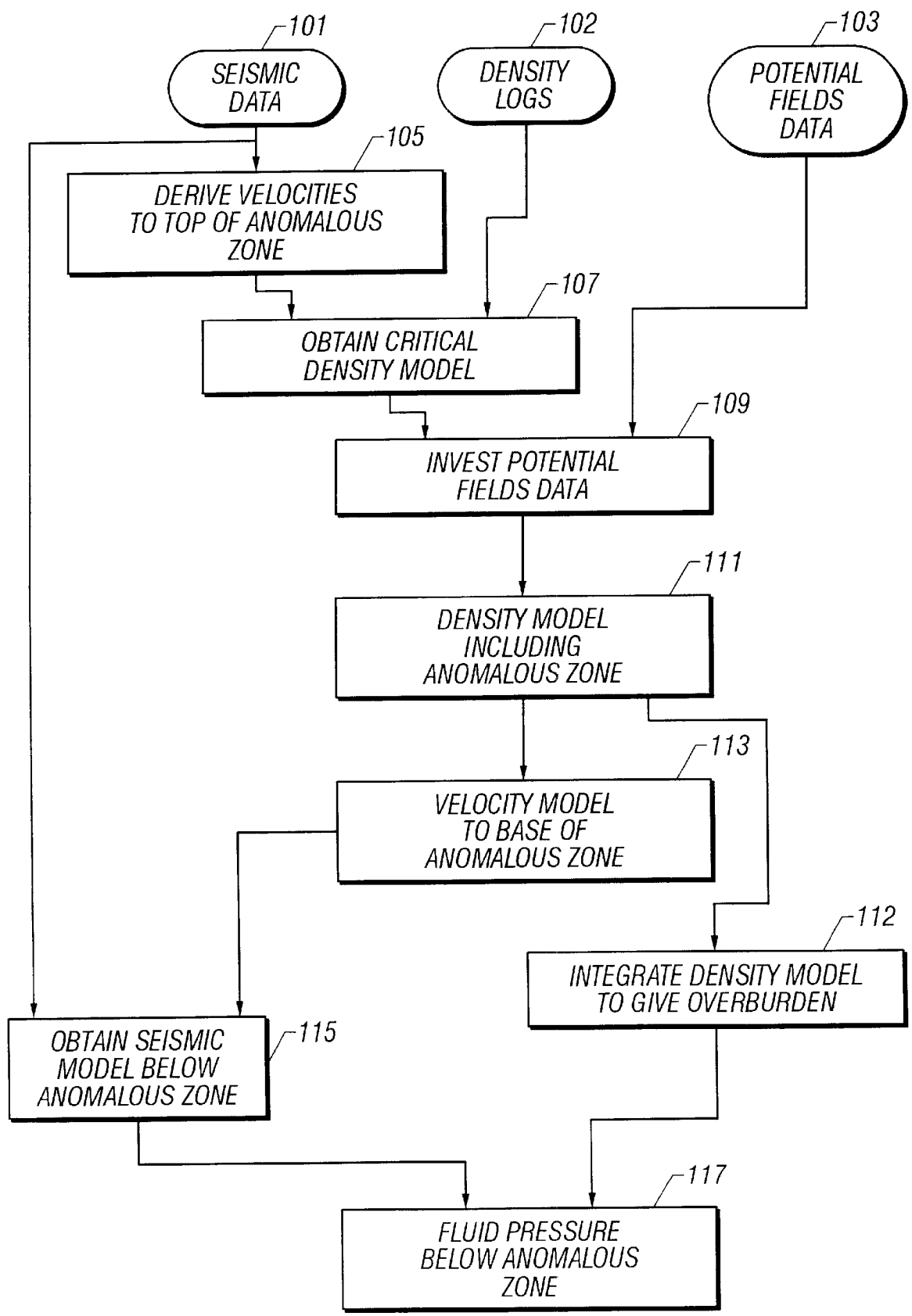
FIG. 2 illustrates an embodiment of the invention for using seismic and potential fields data for determination of formation fluid pressure underneath an anomalous formation.

The present invention is best understood by reference to FIGS. 1–2. Referring first to FIG. 1, the main steps involved in the present method of determination of subterranean fluid pressure are shown.

The method uses two main types of data. The first type of data is seismic data 1 that is acquired over the area of interest. This may be in a land or marine environment and, using methods known in the art, the seismic data are processed to give an initial model of seismic velocities for the subsurface 5. The second type of data that is acquired is potential fields data 3. This type of data that has not been used extensively in the past for subsurface fluid pressure prediction. It includes gravity and magnetic data, both vector and tensor data. Optionally, density information, such as well logs 2, may also be used. The use of density logs is discussed below.

Gravity gradiometry has been in existence for many years although the more sophisticated versions have been held as military secret until recently. The measure of gravity has become more acceptable in the late eighteen hundreds when measuring instruments with greater sensitivity were developed. Prior to this time, while gravity could be measured, variations in gravity caused by the effect of a large nearby object at one location, the gravity gradient, could not be reliably measured.

It has been known since the time of Sir Isaac Newton that bodies having mass exert a force on each other. The measurement of this force can identify large objects having a change in density even though the object is buried beneath the earth's surface or in other ways out of sight.

As discussed below, the potential fields data are used in determining the fluid pressure in subsurface formations. The spatial resolution obtained from this process is normally much lower resolution than that obtained from acoustic seismic data. However, models obtained from gravity and magnetic data can provide a more accurate determination of subsurface overburden loads.

The initially derived seismic velocity model is used to obtain an initial estimate of structure of the subsurface. Additionally, it may also be used to obtain the density distribution in the subsurface using known methods 7. For example, Gardner (1974) has derived an empirical relation between the density of commonly observed subsurface sedimentary rock and the velocity of propagation of seismic waves through the rocks. Alternatively, the initial values of density may be obtained using supplemental information such as density logs 2 from nearby wells that are used directly as input to the density model or used with velocity data to fit a locally-calibrated Gardner relationship for a specific area. The use of the well control in conjunction with a seismic structure map makes it possible to extrapolate densities from the wells to the area of interest.

In copending U.S. patent application Ser. No. 09/285,570, having the same assignee, a method of inverting the potential fields data is described. The contents of this application are fully incorporated here by reference. In one embodiment of the disclosure of the '570 application, various corrections are applied to the potential fields data. An initial density model using seismically derived velocities is specified to the inversion process and the potential fields data are inverted within specified constraints to derive a density model of the subsurface of the earth. The initial model, as described in the '570 application, includes a topographic surface representing the land surface for land seismic data, or a bathymetric surface for marine data. In the present invention, the method of the '570 application is used with the initial density model 7 and certain constraints on the allowable densities in the inversion process to obtain a density model for the subsurface 9. The constraints in the present invention limit the allowable values in the inversion process to a range of values around the initial density model 7.

As discussed in the '570 application the result of the inversion is a 2-D, 2.5-D, 2.75-D or 3-D model of the subsurface of the earth. This density model is then integrated with respect to depth using known methods to obtain values for the overburden stresses in the subsurface 15.

Using the velocities derived at 5, the effective stresses in the subterranean formations are determined 13. As noted above, the '929 patent gives a method for relating the interval velocity V to the effective stress. The model used in the '929 patent is a relationship of the form $$V \sim C + A\sigma^B \qquad (1)$$

where V is the interval velocity, and A, B and C are determined empirically from observations. Typically, the value of C is approximately 5000 ft/s.

Other relations between the velocity and the effective stress could also be used. For example, Gassmann (1951) showed that for a packing of elastic spheres, the bulk modulus of the packing β is proportional to the two-thirds power of the effective stress.

$$\beta (P_e)^{2/3} \qquad (2)$$

The compressional velocity $V_p$ is related to the bulk modulus by the relation $$V_p = \left(\frac{\beta}{\rho}\right)^{\frac{1}{2}} \qquad (3)$$

Where ρ is the density. Empirically, the value of the exponent B in equation (1) is usually found to be close to ⅓ which is consistent with the value predicted by Gassman's model calculations in equations (2) and (3).

While a packing of elastic spheres is not a good representation of sedimentary rocks, the power law is nevertheless generally accepted to be a good empirical relation between effective stress and the compressional wave (P-wave) velocity of a rock. For example, Hamilton (1976), shows empirical data of compressional and shear velocities of water saturated sands as a function of effective stress. The data are consistent with a power law relation between velocity and effective stress.

Returning to FIG. 1, the difference between the overburden stress 15 and the effective stress 13 is determined 17 to give an estimate of the fluid pressure in the subsurface 19. This estimated fluid pressure may be used to guide the drilling process by, e.g., selecting a suitable mud weight in the borehole to avoid the risk of a kick or a blowout. Under normal conditions, the mud weight is chosen so that the pressure exerted by the column of mud in the borehole is slightly in excess of the fluid pressure in the formation but less than the pressure that could cause formation damage by forcing drilling mud into the formation through fracture failure. Accordingly, if the determined formation fluid pressure at any projected depth during the drilling of the borehole is abnormally low, the mud weight is reduced to avoid formation damage. Conversely, if the determined formation fluid pressure is abnormally high, the mud weight used in drilling is increased to avoid the danger of a kick.

In drilling operations, the mud is circulated down the drillstring to the drillbit and returns up to the surface through the annulus between the drillstring and the borehole. Those versed in the art would recognize that even if the mud weight is selected so as to not cause formation damage under static conditions, this may not be sufficient to maintain borehole integrity under dynamic conditions. During drilling, the mud pressure at the bottom of the borehole has to be sufficient to enable the mud returning from the bottom of the borehole to overcome frictional losses in the borehole, so that the bottom hole mud pressure will exceed the hydrostatic pressure of the formation. This may be sufficient to fracture the formation at the bottom hole. Accordingly, it is necessary to monitor a number of different parameters, such as flow rate of the mud, in addition to the mud weight, to maintain the integrity of the borehole. The flow rate of the mud in turn limits the weight on bit, the rate of penetration and the torque on the bit. All of these are parameters that are controlled in the present invention based upon knowledge of the formation fluid pressure.

FIG. 2 discloses an alternative embodiment of the invention wherein the subsurface includes an anomalous region in which the seismic velocity and/or density is significantly different from that of the neighboring regions. An example of such an anomalous region is a salt body. As would be known to those versed in the art, the salt has a significantly different seismic velocity than sedimentary formations in which the salt may be present, making it difficult to obtain seismic images or seismic velocities below the salt body. Starting with the seismic data 101, an initial determination of seismic velocities to the top of the anomalous zone is made 105. This, as discussed above with reference to FIG. 1 above is used to derive an initial structural model to the top of the anomalous zone 107. The density model includes density information that is derived either from seismic velocities or from well logs 102. The initial model also includes an initial estimate for the density of the anomalous zone. This is generally straightforward as rock type of the anomalous zone would be known from geological considerations and the density of the common rock types that produce anomalies are usually constant. For example, salt has a density of 2.10 g/cc and a seismic velocity of 14200 ft/s.

Using the method described in the '570 application, the potential fields data 103 are inverted 109. The difference from this step and the inversion step 9 of FIG. 1 is that here, the inversion is carried out to give a base of the anomalous zone. This inverted model gives a velocity model for the anomalous zone: as noted above, the seismic velocities for the common types of anomalies are known. More importantly, the inversion gives an estimate of the lower boundary of the anomalous zone that can be used to construct an improved velocity model that includes the base of the anomalous zone 113. The velocities of common types of anomalous rock types are known, so this makes it possible to use the inverted model in an improved processing of the seismic data to obtain better estimates of the seismic velocities below the anomalous zone. For example, in commonly used methods of prestack migration of seismic data, the inverted model is used as a starting point for migration of data from greater depths and obtaining improved velocity estimates for the deeper formation. The density model 111 is integrated vertically to give an overburden stress 112. These determined seismic velocities 115 and the overburden 112 can be used to determine formation fluid pressures using the method described above with reference to FIG. 1.

Where the anomalous region is a salt body, it is commonly a result of gravity-driven diapiric flow of the salt into higher density sediments. Those versed in the art would recognize that due to the fact that the salt is lighter than the surrounding sedimentary formations, there would be an unloading of the overburden stress and hysterisis effects must be accounted for. This hysterisis effect has been described in the '929 patent.

When a formation is buried and subjected to increasing depths of burial and stress, the velocity increases as expected by a model such as equation (1) or (2). When the overburden stress is reduced, either by uplift or by intrusion of salt that has a lower density than the surrounding sediments, the velocity only partially decreases, so that the velocity is higher than that given for a normally-compacted rock at the same effective stress.

Where the anomalous body is a volcanic intrusive or extrusive body that has higher density than the surrounding sedimentary formations, the overburden stress will be higher than would be expected in a comparable depth of sedimentary rocks. The present invention is able to account for the effects of zones of anomalous density by determining the actual density, whereas prior art methods assume that density increases uniformly with depth or varies with depth based on limited well information.

While there has been illustrated and described a particular embodiment of the present invention, it will be appreciated that numerous changes and modifications will occur to those skilled in the art, and it is intended in the appended claims to cover all those changes and modifications which fall within the true spirit and scope of the present invention.

What is claimed is:

1. A method for determining formation fluid pressure in a subterranean formation, the method comprising:
   (a) obtaining a measurement of at least one component of potential fields data at a plurality of locations over a region including the formation, said potential fields data selected from magnetic data and gravity data;
   (b) using seismic data acquired at a plurality of locations in said region for obtaining an initial model of density in the region;
   (c) using the initial model of density for inverting the at least one component of obtained potential fields data and determining an updated density model;
   (d) using the updated density model for determining an overburden stress in the formation;
   (e) determining an effective stress in the formation from the seismic data; and
   (f) determining the formation fluid pressure from the determined overburden stress and the effective stress.

2. The method of claim 1, wherein the at least one component of potential fields data is at least one of: (i) a component of vector gravity field, (ii) a component of tensor gravity field, (iii) a component of vector magnetic field, and, (iv) a component of tensor magnetic field.

3. The method of claim 1, wherein obtaining the initial model of density further comprises:
   (i) determining seismic velocities in the region from the acquired seismic data; and
   (ii) using an empirical relation between seismic velocities and densities in determining the initial model of density.

4. The method of claim 1, wherein obtaining the initial model of density further comprises (i) using densities from well logs near said, and (ii) using well density and velocity data to derive a locally-calibrated empirical relation for converting seismic velocities to densities.

5. The method of claim 1, wherein inverting the at least one component of potential fields data further comprises using the initial model of density as a starting point for an iterative inversion scheme.

6. The method of claim 5, wherein inverting the at least one component of potential fields data further comprises using constraints derived from the initial model of density in the iterative inversion scheme.

7. The method of claim 1, wherein determining the overburden stress further comprises performing a vertical integration of the updated density model.

8. The method of claim 3, wherein determining the effective stress further comprises using an empirical relationship between the determined seismic velocities and the effective stress.

9. The method of claim 1, wherein determining the updated model further comprises:
   (i) for said initial model, estimating a value of said at least one component of potential fields data at said plurality of locations;
   (ii) determining a difference between said estimated value and said obtained value of said measurements at said plurality of locations;
   (iii) updating the model of the region based on said difference; and
   (iv) iteratively repeating steps (i)–(iii) until said difference is less than a predetermined value, giving the updated geophysical model.

10. The method of claim 1 further comprising using the determined formation fluid pressure to guide a parameter of a drilling process used for drilling a borehole in the subterranean formation.

11. The method of claim 1, wherein inverting the at least one component of potential fields data further comprises using constraints derived from the initial model of density in the iterative inversion scheme.

12. The method of claim 1 further comprising using the determined formation fluid pressure to analyze stability of a wellbore drilled in the formation.

13. The method of claim 8, wherein the formation has been subjected to an unloading of overburden above the formation, and wherein determining the effective stress further comprises a correction for a hysterisis effect related thereto.

14. The method of claim 3 further comprising using the updated model for obtaining improved seismic velocities and using said improved seismic velocities in determining the effective stress.

15. The method of claim 1, wherein the initial model determined from the seismic data includes one of (i) a topographic surface representing the land surface, and, (ii) a bathymetric surface for marine data.

16. A method for determining formation fluid pressure in a subterranean formation underneath a zone of anomalous density, the method comprising:
   (a) obtaining a measurement of at least one component of potential fields data at a plurality of locations over a region including the formation, said potential fields data selected from magnetic data and gravity data;
   (b) using seismic data acquired at a plurality of locations in said region for obtaining an initial model of density above the anomalous zone;

(c) using the initial model of density for inverting the at least one component of obtained potential fields data and determining an updated density model including the anomalous zone;

(d) using the updated density model for determining an overburden stress in the formation;

(e) determining an effective stress in the formation from the seismic data and the updated density model; and (f) determining the formation fluid pressure from the determined overburden stress and the effective stress.

17. The method of claim 16, wherein the anomalous zone comprises at least one of (i) a salt body, (ii) a shale diapir, (iii) a magma flow, and, (iv) a magmatic intrusion.

18. The method of claim 16, wherein the initial model includes an upper boundary of the anomalous zone and determining the updated density model further comprising determining a lower boundary of the anomalous zone.

19. The method of claim 16, wherein the at least one component of potential fields data is at least one of (i) a component of vector gravity field, (ii) a component of tensor gravity field, (iii) a component of vector magnetic field, and, (iv) a component of tensor magnetic field.

20. The method of claim 16, wherein obtaining the initial model of density further comprises:

(i) determining seismic velocities in the region from the acquired seismic data; and (ii) using an empirical relation between seismic velocities and densities in determining the initial model of density.

21. The method of claim 16, wherein obtaining the initial model of density further comprises (i) using densities from well logs in the vicinity of said region, and (ii) using well density and velocity data to derive a locally-calibrated empirical relation for converting seismic velocities to densities.

22. The method of claim 16, wherein inverting the at least one component of potential fields data further comprises using the initial model of density as a starting point for an iterative inversion scheme.

23. The method of claim 20, wherein inverting the at least one component of potential fields data further comprises using constraints derived from the initial model of density in the iterative inversion scheme.

24. The method of claim 16, wherein determining the overburden stress further comprises performing a vertical integration of the updated density model.

25. The method of claim 20, wherein determining the effective stress further comprises using an empirical relationship between the determined seismic velocities and the effective stress.

26. The method of claim 16, wherein determining the updated model further comprises:

(i) for said initial model, estimating a value of said at least one component of potential fields data at said plurality of locations;

(ii) determining a difference between said estimated value and said obtained value of said measurements at said plurality of locations;

(iii) updating the model of the region based on said difference; and (iv) iteratively repeating steps (i)–(iii) until said difference is less than a predetermined value, giving the updated geophysical model.

27. The method of claim 16 further comprising using the determined formation fluid pressure to guide a parameter of a drilling process used for drilling a borehole in the subterranean formation.

28. The method of claim 16, wherein inverting the at least one component of potential fields data further comprises using constraints derived from the initial model of density in the iterative inversion scheme.

29. The method of claim 16 further comprising using the determined formation fluid pressure to analyze stability of a wellbore drilled in the formation.

30. The method of claim 25, wherein the formation has been subjected to an unloading of overburden above the formation, and wherein determining the effective stress further comprises a correction for a hysterisis effect related thereto.

31. The method of claim 16 further comprising using the updated model for obtaining improved seismic velocities and using said improved seismic velocities in determining the effective stress.

32. The method of claim 16, wherein the initial model determined from the seismic data includes one of (i) a topographic surface representing the land surface, and, (ii) a bathymetric surface for marine data.

* * * * *